Aug. 19, 1958     J. B. MAJERUS ET AL     2,848,627
RANGE GATE LOCK-ON CIRCUIT
Filed Feb. 6, 1957
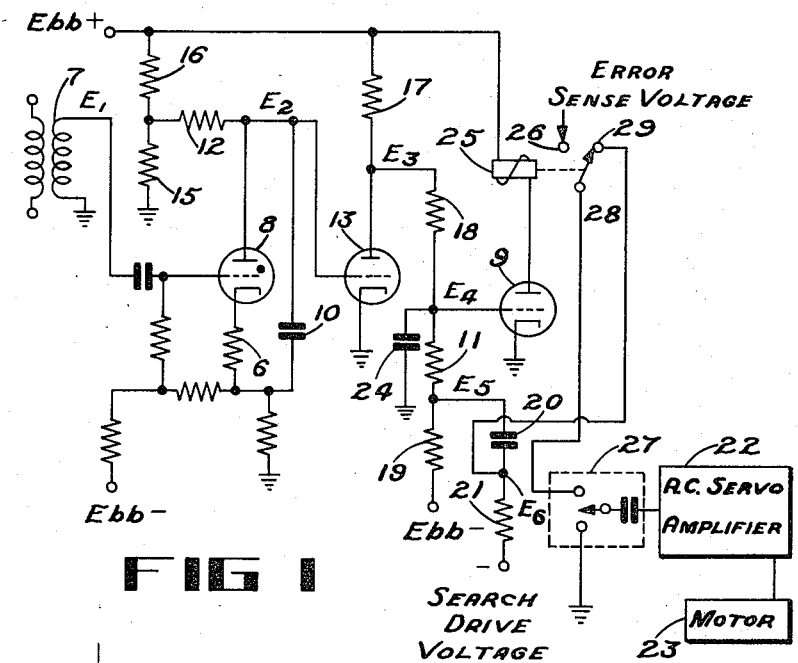
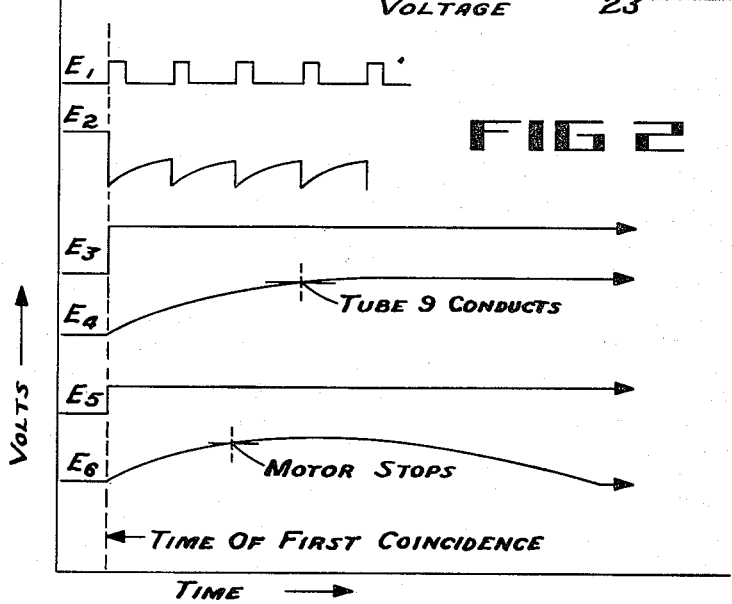
INVENTORS
JOHN B. MAJERUS
WALLACE W. PRATHER
BY
*Woodyard Harsha*
ATTORNEYS

United States Patent Office 2,848,627
Patented Aug. 19, 1958

2,848,627

RANGE GATE LOCK-ON CIRCUIT

John B. Majerus and Wallace W. Prather, Cedar Rapids, Iowa, assignors to Collins Radio Company, Cedar Rapids, Iowa, a corporation of Iowa Application February 6, 1957, Serial No. 638,496

6 Claims. (Cl. 307—81)

This invention relates to navigation systems and more particularly to navigation systems employing distance measuring devices.

Recently, navigation systems utilizing both bearing and distance information have been developed. This invention relates to distance measuring equipment which measures distance by interrogator and responder signals. In such distance measuring systems, an interrogation pulse is transmitted from a mobile transmitter. A stationary receiver at a fixed geographical location receives the interrogation pulse. The receiver then triggers a reply pulse on an associated transmitter. The reply pulse is received by a receiver associated with the mobile transmitter or interrogator. The mobile receiver then measures the time interval between the transmission of the interrogation pulse and the reception of the reply pulse. It is well-known that this time interval may be used to accurately determine the distance of the fixed transmitter from the mobile transmitter.

Normally, the distance circuits in distance measuring equipments search between prescribed distance limits. The distance measuring equipment is attempting to find a reply pulse within the distance limits so that this reply pulse may be tracked. In order to contact this search between the prescribed limits, range gates are varied between definite values by well-known means. One of these well-known means which may be used in distance measuring equipment with which this invention is operable is to rotate a shaft and thereby change the phase of the output signal or interrogation signal.

When a reply pulse or signal is received by the interrogation or mobile receiver, the searching between the prescribed range limits must be stopped and the reply pulse continuously tracked. This distance tracking of the reply pulse, in conjunction with the bearing information which forms no part of this invention, provides a definite navigational fix. The distance interval which is varied as the shaft is rotated must be switched from a searching voltage control to a tracking voltage control. The searching voltage is varied at a predetermined rate and the tracking voltage must vary in accordance with the time differential between reply pulse and range gates. The requirements of this switching from searching function to tracking function are: that the switching be performed smoothly, that the switching not be performed upon spurious signals, and that the switching will not be interrupted by the loss of a single reply signal due to fading or poor signal-to-noise ratios.

It is an object of this invention to provide means of switching distance measuring equipment from searching function to tracking function with a minimum of mechanical operations. It is another object of this invention to provide a switching means which, upon receipt of a bona fide reply signal, will lock on distance measuring equipment to the reply signal. It is a further object of this invention to provide a lock-on circuit for automatic range processes which is sufficiently rapid in its operation to prevent over-shooting and yet is sufficiently retarded in operation to be unresponsive to spurious signals. It is a still further object of this invention to provide switching means which is not interrupted by signal fading or poor signal-to-noise ratios.

These and other objects of this invention will become apparent when the following description is read in conjunction with the drawing in which, Figure 1 is a schematic representation of one embodiment of this invention, and Figure 2 is a graphical representation of wave forms at various points in the novel circuit of this invention.

The distance measuring equipment with which this invention is co-operatively associated is normally operated between predetermined distance limits. This operation between the distance limits is accomplished by the rotation of a shaft attached to motor 23 which varies the phase of an interrogation voltage. The rotation of the shaft changes the search range in a manner well-known in the art which is not illustrated and which will not be explained herein inasmuch as it is not part of this invention. This invention relates to the control mechanism for rotating this shaft or other means of changing the distance circuits of a distance measuring equipment.

Ordinarily, during the search process in the distance measuring equipments, a search drive voltage is utilized to drive a motor at a predetermined rate. In this invention the search drive voltage is applied to the chopper 27 and the servo amplifier 22 to drive the motor 23 at a predetermined rate during the search process. The distance measuring equipment with which this invention is associated provides that when a reply signal is received in coincidence with the range gates, a new pulse is generated thereby. This coincidence may occur between an early and/or a late range gate. If the reply signal is received between the early and the late gate, a coincidence pulse is generated. The circuits for generating this coincidence pulse are well-known in the art and will not be described herein as they form no part of this invention.

The coincidence pulse generated by the associated distance measuring equipment is applied to the secondary winding of the transformer 7. These coincidence pulses are in the form of pulses similar to the pulse E1 depicted in Figure 2. The first of these coincidence pulses applied to the windings of the transformer 7 will cause thyratron tube 8 to fire. Once the thyratron tube 8 is fired, it will continue to fire as long as coincidence pulses are applied to its grid from the transformer 7. The firing of the thyratron tube 8 causes a negative voltage to occur on the plate of tube 8. This negative voltage will be similar to the wave form shown as E2 in Figure 2.

This negative voltage similar to E2 of Figure 2 is applied to the grid of the tube 13. This surge of negative voltage on the grid of tube 13 renders tube 13 non-conductive. With tube 13 in a non-conductive state, a positive voltage will exist on the plate of tube 13. This positive voltage results from the B+ supply voltage and the wave form of the voltage existing on the plate of tube 13 will be similar to the wave form E3 depicted in Figure 2. The resistance element 6 limits the conduction of the thyratron tube 8 to its rated value. The recovery time of the thyratron tube is dependent upon the time constant of the resistance 6 and the capacitance 10. It must be remembered that the time constant of the resistance capacitance elements associated with thyratron tube 8 is such that every distance reply pulse or signal, as well as every other reply pulse, will generate a coincidence pulse in sufficient time to maintain the thyratron tube 8 in a conductive state.

The existence of a positive voltage on the plate of tube 13 results in a positive voltage being generated in the voltage divider network, including resistance elements 11, 17, 18, and 19. A positive voltage is simultaneously occurring across capacitance element 20 and resistance element 21. When the distance measuring equipment is operating in the search position, a servo drive voltage is applied to the motor 23 through the servo amplifier 22 and chopper 27 from the junction between resistance element 21 and capacitance element 20. When tube 13 is in a conductive state, this is normally a negative voltage and drives the motor 23 at a prescribed rate. When tube 13 is rendered non-conductive, this junction between resistance element 21 and capacitance element 20 begins to change its voltage value. The voltage at this junction point changes in a positive direction due to the application of a voltage similar to the voltage depicted as E6 in Figure 2. As this increasingly positive value of voltage is applied to the motor 23 through the chopper 27 and the amplifier 22, the rotational speed of the motor is thereby reduced. As the positive voltage continues to build up, the motor 23 is stopped just prior to the conduction of tube 9. In one specific embodiment of this invention which was caused to be constructed, the motor stopped at the indicated point on the voltage wave form E6 and the tube 9 commenced conduction at the indicated point on the voltage wave form E4 of Figure 2.

Tube 9 is normally in a non-conductive state due to the negative value of the voltage applied to the grid thereof. The voltage on the grid of tube 9 is varied when tube 13 is rendered non-conductive. The voltage applied to the grid of tube 9 is made increasingly positive in a manner similar to the wave form E4 of Figure 2. The positive voltage applied to the grid of tube 9 rises as the time constant of a circuit including the capacitance 24. This time constant is sufficiently long so that tube 9 will conduct between successive and bona fide coincidence pulses but will not conduct due to coincidence pulses which might result from spurious reply signals.

When tube 9 conducts, plate current flows and the winding of relay 25 is energized. When the winding of relay 25 is energized, the contact arm 28 is switched from the search drive voltage contact 29 to the error sense voltage contact 26. The error sense voltage is generated by the distance measuring equipment with which this invention is associated from the time differences between the reply signals and the range gates. This error sense voltage is then applied through servo amplifier 22 and the chopper 27 to the motor 23. Motor 23 is then made responsive to the small error signals due to the time differences between the range gates and the selected reply signals. The servo amplifier drives the motor 23 so as to maintain coincidence between the range gates and the reply pulse at the selected range. This means that the distance to the geographically fixed transmitter is continuously and automatically tracked by this equipment.

This invention provides for a lock-on circuit for automatic tracking which is activated only by coincidence pulses from reliable reply pulses. This invention means that when the range gate of distance measuring equipment encounters a return pulse during search and generates coincidence pulses in a repetitious fashion, the search function of the distance measuring equipment is switched to the track function. This invention provides a simplified circuit which meets the severe requirements of stopping a motor and switching its control in a minimum of time and without numerous momentary stoppages during the search function.

Although this invention has been described with respect to a particular embodiment thereof it is not to be so limited as changes and modifications may be made therein which are within the full intended scope of the invention as defined by the appended claims.

What is claimed is:

1. Means for generating varied output signals responsive to repetitive pulse signals including input means having repetitive pulses applied thereto, means responsive to said input pulses for generating a saw-tooth voltage, a first switch means, a source of direct current voltage, current flow from said source of direct current voltage controlled by said first switch means, a second switch means, a first delay means, a third switch means, said second switch means connected to said source of direct current voltage and said first switch means, said first delay means connected to said source of direct current voltage and said second switch means, said second switch means responsive to signals generated by said first delay means, said first delay means actuated by signals applied from said first switch means, output means, a first output signal source, a second output signal source, said first output signal source connected to said output means, a second delay means connected to said first switch means and said output means generating a time variable signal, the signals applied to said output means being a resultant of said first output signals and said time variable signals from said second delay means, and said second source of output signals connected to said output means by the operation of said third switch means which simultaneously removes said first output signals from said output means.

2. Means for generating varied output signals responsive to repetitive pulse signals including input means having repetitive pulses applied thereto, means responsive to said input pulses for generating a saw-tooth voltage, said generating means comprising an electron discharge device and a charging circuit where said input pulses must be more frequent than the time constant of said charging circuit to maintain said electron device in a conductive state, a first switch means, a source of direct current voltage, current flow from said source of direct current voltage controlled by said first switch means, a second switch means, a first delay means, a third switch means, said second switch means connected to said source of direct current voltage and said first switch means, said first delay means connected to said source of direct current voltage and said second switch means, said second switch means responsive to signals generated by said first delay means, said first delay means actuated by signals applied from said first switch means, output means, a first output signal source, a second output signal source, said first output signal source connected to said output means, a second delay means connected to said first switch means and said output means generating a time variable signal, the signals applied to said output means being a resultant of said first output signals and said time variable signals from said second delay means, and said second source of output signals connected to said output means by the operation of said third switch means which simultaneously removes said first output signals from said output means.

3. Means for generating varied output signals responsive to repetitive pulse signals including input means having repetitive pulses applied thereto, means responsive to said input pulses for generating a saw-tooth voltage, said generating means comprising an electron discharge device and a charging circuit where said input pulses must be more frequent than the time constant of said charging circuit to maintain said electron discharge device in a conductive state, a first switch means, said first switch means comprising an electron discharge device having its grid controlled by said saw-tooth voltages, a source of direct current voltage, current flow from said source of direct current voltage controlled by the conductive state of said first switch means, a second switch means, a first delay means, a third switch means, said second switch means connected to said source of direct current voltage and said first switch means, said first delay means connected to said source of direct current voltage and said switch means, said second switch means responsive to signals generated by said first delay means, said first delay means actuated by signals applied from said first switch means, output means, a first output signal source, a second output signal source, said first output signal source connected to said output means, a second delay means connected to said first switch means and said output means generating a time variable signal, the signals applied to said output means being a resultant of said first output signals and said time variable signals from said second delay means, and said second source of output signals connected to said output means by the operation of said third switch means which simultaneously removes said first output signals from said output means.

4. Means for generating varied output signals responsive to repetitive pulse signals including input means having repetitive pulses applied thereto, means responsive to said input pulses for generating a saw-tooth voltage, said means comprising an electron discharge device and a charging circuit where said input pulses must be more frequent than the time constant of said charging circuit to maintain said electron discharge device in a conductive state, a first switch means, said first switch means comprising an electron discharge device including at least a plate, a grid and a cathode and having its grid controlled by said saw-tooth voltages, a source of direct current voltage, current flow from said source of direct current voltage controlled by the conductive state of said first switch means, a second switch means, said second switch means comprising an electron discharge device including a plate, a cathode and a grid, a first delay means, a third switch means, the grid of said second switch means connected to said source of direct current voltage and said first switch means, said first delay means connected to said source of direct current voltage and said second switch means, said second switch means responsive to signals generated by said delay means, said second switch means actuated by signals applied from said second switch means, output means, a first output signal source connected to said output means, a second delay means connected to said first switch means and said output means generating a time variable signal, the signals applied to said output means being a resultant of said first ouput signals and said time variable signals from said second delay means, and said second source of output signals connected to said output means by the operation of said third switch means which simultaneously remove said first output signals from said output means.

5. Means for generating varied output signals responsive to repetitive pulse signals including input means having repetitive pulses applied thereto, means responsive to said input pulses for generating a saw-tooth voltage, said means comprising an electron discharge device and a charging circuit where said input pulses must be more frequent than the time constant of said charging circuit to maintain said electron discharge device in a conductive state, a first switch means, said first switch means comprising an electron discharge device including at least a plate, a grid and a cathode and having its grid controlled by said saw-tooth voltages, a source of direct current voltage, current flow from said source of direct current voltage controlled by the conductive state of said first switch means, a second switch means, said second switch means comprising an electron discharge device including a plate, a cathode and a grid, a first delay means, a third switch means, said third switch means comprising a relay having its coil winding with one side connected to said source of direct current voltage and the other side connected to the plate of said second switch means, said second switch means connected to said source of direct current voltage and said first switch means, said first delay means connected to said source of direct current voltage and said second switch means, said second switch means responsive to signals generated by said delay means, said second switch means actuated by signals applied from said second switch means, output means, a first output signal source, a second output signal source, said first output signal source connected to said output means, a second delay means connected to said first switch means and said output means generating a time variable signal, the signals applied to said output means being a resultant of said first output signals and said time variable signals from said second delay means, and said second source of output signals connected to said ouput means by the operation of said third switch means which simultaneously remove said first output signals from said output means.

6. Means for generating varied output signals responsive to repetitive pulse signals including input means having repetitive pulses applied thereto, means responsive to said input pulses for generating a saw-tooth voltage, said means comprising an electron discharge device and a charging circuit where said input pulses must be more frequent than the time constant of said charging circuit to maintain said electron discharge device in a conductive state, a first switch means, said first switch means comprising an electron discharge device including at least a plate, a grid and a cathode and having its grid controlled by said saw-tooth voltages, a source of direct current voltage, current flow from said source of direct current voltage controlled by the conductive state of said first switch means, a second switch means, said second switch means comprising an electron discharge device including a plate, a cathode and a grid, a first delay means, a third switch means, said third switch means comprising a relay having its coil winding with one side connected to said source of direct current voltage and the other side connected to the plate of said second switch means, said second switch means connected to said source of direct current voltage and said first switch means, said first delay means connected to said source of direct current voltage and said second switch means, said second switch means responsive to signals generated by said delay means, said second switch means actuated by signals applied from said second switch means, output means, a first output signal source, a second output signal source, said first output signal source connected to said output means, a second delay means generating a time variable signal, said second delay means comprising a resistance capacitance network where one side of the resistance capacitance network is connected to the plate of said first switch means and the other side is connected to said output means, the signals applied to said output means being a resultant of said first output signals and said time variable signals from said second delay means, and said second source of output signals connected to said output means by the operation of said third switch means which simultaneously removes said first output signals from said output means.

No references cited.